US008943770B2

(12) United States Patent
Sanders et al.

(10) Patent No.: US 8,943,770 B2
(45) Date of Patent: Feb. 3, 2015

(54) INSULATED PANEL AND METHOD OF ASSEMBLY

(75) Inventors: Philip Sanders, Orange (AU); Rohit Chitre, Orange (AU); Mohammed Anwar, Orange (AU)

(73) Assignee: Electrolux Home Products PTY Limited, New South Wales (AU)

( * ) Notice: Subject to any disclaimer, the term of this patent is extended or adjusted under 35 U.S.C. 154(b) by 1 day.

(21) Appl. No.: 13/509,671

(22) PCT Filed: Nov. 19, 2010

(86) PCT No.: PCT/AU2010/001560
§ 371 (c)(1),
(2), (4) Date: Sep. 18, 2012

(87) PCT Pub. No.: WO2011/060502
PCT Pub. Date: May 26, 2011

(65) Prior Publication Data
US 2013/0195544 A1    Aug. 1, 2013

(30) Foreign Application Priority Data

Nov. 20, 2009    (AU) ................................ 2009905704

(51) Int. Cl.
*E04B 2/56*    (2006.01)
*F16B 5/00*    (2006.01)
*F25D 23/08*    (2006.01)
*E04B 2/60*    (2006.01)
*A47F 3/04*    (2006.01)
*F16B 5/06*    (2006.01)
*F16B 5/12*    (2006.01)
*F16B 11/00*   (2006.01)

(52) U.S. Cl.
CPC ... *F16B 5/00* (2013.01); *E04B 2/56* (2013.01);
*F25D 23/085* (2013.01); *E04B 2/60* (2013.01);
*A47F 3/0482* (2013.01); *F16B 5/0635*
(2013.01); *F16B 5/128* (2013.01); *F16B 11/006*
(2013.01)
USPC ........................................ 52/282.3

(58) Field of Classification Search
USPC ............... 52/717.02, 717.01, 718.04, 717.05,
52/716.8, 279, 281, 282.3, 273, 282.1,
52/458, 461, 468; 403/267
See application file for complete search history.

(56) References Cited

U.S. PATENT DOCUMENTS

| 3,363,377 | A | * | 1/1968 | Beckman | 52/275 |
| 3,520,581 | A |   | 7/1970 | Borghi |  |
| 3,728,834 | A | * | 4/1973 | Dean | 52/282.3 |
| 4,258,519 | A | * | 3/1981 | Hugens | 52/282.1 |
| 5,689,924 | A | * | 11/1997 | Mason | 52/239 |

(Continued)

FOREIGN PATENT DOCUMENTS

| EP | 0425281 | 5/1991 |
| FR | 2245243 | 4/1975 |
| GB | 2260178 | 4/1993 |

*Primary Examiner* — William Gilbert
*Assistant Examiner* — Kyle Walraed-Sullivan
(74) *Attorney, Agent, or Firm* — RatnerPrestia (57) ABSTRACT

An insulated panel including first and second walls (5.004, 5.024) spaced apart by a predetermined distance, each wall including an internal peripheral channel formed by first and second bends, the second bend forming an internal peripheral flange (5.025, 5.056), the panel including an intermediate joining member (5.042) adapted to connect to the internal peripheral flanges of the first and second walls. The connection to a first flange can be via a slot (6.046), and the connection to the second flange can be by adhesive (5.044).

12 Claims, 9 Drawing Sheets

(56) References Cited

U.S. PATENT DOCUMENTS

| | | | |
|---|---|---|---|
| 5,775,051 A * | 7/1998 | Nicolai et al. | 52/281 |
| 6,260,377 B1 | 7/2001 | Tamaoki et al. | |
| 6,374,571 B1 * | 4/2002 | Mann | 52/783.1 |
| 6,725,624 B2 * | 4/2004 | Hirath et al. | 52/800.11 |
| 6,776,464 B2 * | 8/2004 | Klassen et al. | 312/265.1 |
| 7,140,159 B2 | 11/2006 | Avendano et al. | |
| 2007/0094992 A1 * | 5/2007 | Antonic | 52/656.1 |
| 2010/0205883 A1 * | 8/2010 | Carson | 52/281 |

\* cited by examiner

INSULATED PANEL AND METHOD OF ASSEMBLY

FIELD OF THE INVENTION

This invention relates to insulated panels and a method of assembling insulated panels.

The invention is particularly suited for insulated panels for cold apparatus such as, for example, refrigerators, freezers, refrigerator and freezer combinations, wine coolers, wine cabinets, side by side, multi door and undercounter refrigerators etc.

BACKGROUND OF THE INVENTION

The manufacture of cold appliance is commonly done close to the customers because of the bulky nature of the appliances, a large proportion of the volume being empty space. This increases the cost of transportation. The cabinet must be easily assembled to form a rigid structure with good thermal insulation characteristics, and to resist moisture migration, and must have an aesthetically attractive appearance. A further complication is that the cabinet must contain technical equipment for performing different functions. In particular, the cold appliance must have a refrigeration system and associated sensors and controls.

Another problem associated with the manufacturing of cold appliances is that it involves high investment costs for the development of product lines and the like. Conventional manufacturing plants for cold appliances are usually inflexible, so that it is difficult to adapt the plant for manufacturing cold appliances with differing dimensions and variable component options in small series. Normally, new product designs require large production runs to be economically feasible. Thus the developers are discouraged from innovation, or variations in product design are very costly.

It is desirable to provide a cold appliance which can be manufactured in segments amenable to transport and which can be assembled to from the cabinet at another location which does not need the complex and expansive manufacturing equipment of the primary manufacturing site. The segments should be easy to assemble and interconnect.

The current method for making insulation panels uses continuous line assembly. However, this can be problematic where foamed-in brackets and reinforcements are required, as improper location of these elements can result in a high scrap rate. Further, it is difficult to incorporate vacuum insulation panels in a continuous line process. Plastic trim over open foam edges needs adhesive to attach the trim. It is also difficult to incorporate roll forming of steel panels into a continuous line process.

This invention seeks to ameliorate, at least in part, one or more of these problems.

SUMMARY OF THE INVENTION

The present invention provides an insulated panel including first and second panel members spaced apart by a predetermined distance, each panel member including a periphery having a peripheral flange or edge, the panel including an intermediate joining member adapted to connect to the peripheral flanges or edges of the first and second panel members.

The joining member can include an elongate profiled member extending at least part way along each side of the flanges of the first and second walls.

The joining member can include at least one channel which will be inwardly directed so as to receive expandable foam.

The joining member can also include at least one slot to engage at least one flange.

The joining member can be attached to at least one of the flanges by adhesive.

The adhesive can be in the form of a double sided foamed tape.

A vacuum panel can be attached to the interior surface of at least one of the walls.

The panel can include foamed-in brackets or reinforcing elements.

The joining member can include a cavity accessible from the outside of the panel.

The cavity can provide a conduit to receive elongated elements, said conduit running partially or totally along length of said panel.

The joining member can have the cavity closed by means of a cap member.

The peripheral flange or edge can be formed by a first bend, or a first and second bend.

The cavity can serve as a conduit to conduct cables and or tubes from one location on said panel to another.

The present invention also provides a method of forming an insulating panel as described above, including the step of roll-forming a bend and or extruding the join member.

The method can include the steps of engaging a joining member to a first panel wall, and attaching the joining member to the second panel wall.

The method can also include the step of filling the space between the panel walls with insulating foam.

The present invention further provides an elongate joining member adapted to join the edges of a pair of panel walls, the joining member including at least one slot or rebate adapted to engage an edge of at least one of the panel wall edges.

The joining member can be a profiled extrusion.

The joining member can include at least one slot adapted to engage an edge of at least one panel wall.

The joining member can include an attachment surface adapted to be attached to an edge of a wall panel by adhesive.

The joining member can include a trim attachment formation.

The trim attachment formation can be in the form of a snap fit section recess.

The joining member can include at least one inboard directed channel portion.

The joining member can include at least one outboard directed channel portion.

The outboard directed channel can be capped to form a covered conduit.

The present invention also provides an elongate joining member adapted to join the edges of a pair of panel walls, the joining member including at each end a corner formation to be received into a respective internal corner of said pair of panel walls, and having at least one slot or channel adapted to receive a sealing means or insulation foam.

The joining member can be a profiled extrusion.

The joining member can include at least two slots, each adapted to receive a sealing means.

The corner formation can include an attachment or rebate surface adapted to be attached to a panel wall by adhesive.

The joining member can include inboard directed projections or channels to allow greater contact for the foaming in of said joining member.

The sealing means can be in the form of a gasket or tape.

The sealing means can be adhered to said slot and projects proud of the outboard periphery of said slot.

The joining member can include a slot or channel which can act as a conduit to conduct cables and or tubes from one location to another.

The present invention further provides an insulated panel including first and second panels spaced apart by a predetermined distance, each panel including an angled periphery formed by a bend, the bend forming an internal corner, the panel including an intermediate joining member adapted to connect to the internal corners of the first and second walls.

The joining member can include an elongate profiled member extending at least part way along each side of the periphery of the first and second walls.

The joining member can include at least one slot or at least one inboard extending projection.

The joining member can be attached to one of the first and second walls by adhesive.

The adhesive can be in the form of a double sided foamed tape.

One or more vacuum panels can be attached to the interior surface of at least one of the walls.

The panel can include foamed-in brackets or reinforcing elements.

The present invention further provides a method of forming an insulating panel as described above, including the step of roll-forming one or two bends at or near to the periphery of the first and second walls.

The method can include the step of engaging a joining member to a first panel wall, and attaching the joining member to the second panel wall.

The method can include the step of filling the space between the panel or walls with insulating foam.

The present invention also, provides a cabinet or, appliance assembled from a panel as described above, or manufactured by the method described above, or which utilises a joining member as described above.

The present invention further provides a joining member, an insulation panel, a cabinet or appliance assembled with these, and a method of manufacturing an insulation panel, being substantially as herein described with reference to the accompanying drawings.

BRIEF DESCRIPTION OF THE DRAWINGS

An embodiment or embodiments of the present invention will now be described, by way of example only, with reference to the accompanying drawings, in which.

The numbering convention used in the drawings is that the digits in front of the full stop indicate the drawing number, and the digits after the full stop are the element reference numbers. Where possible, the same element reference number is used in different drawings to indicate corresponding elements.

It is understood that the drawings are intended to be illustrative rather than exact reproductions, and are not necessarily drawn to scale. The orientation of the drawings is chosen to illustrate the features of the objects shown, and does not necessarily represent the orientation of the objects in use.

DETAILED DESCRIPTION OF THE EMBODIMENT OR EMBODIMENTS

Figure 1:
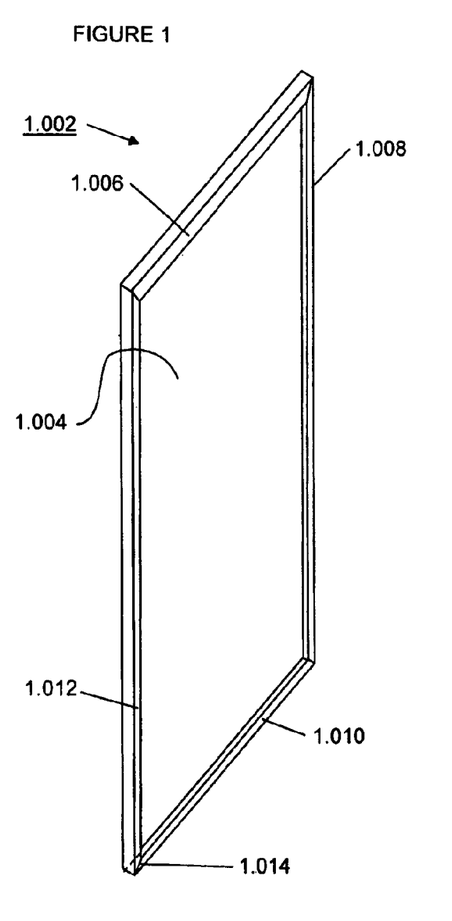
FIG. 1 is an illustration of a first panel adapted for use in an embodiment of the invention

FIG. 1 illustrates an internal wall arrangement 1.002 including a major wall panel 1.004, the edges of which have been folded to form a shallow open box with a peripheral channel with attachment flanges 1.006, 1.008, 1.010, 1.012. The corners of the flanges can be mitred as shown, for example, at 1.014.

Figure 2:
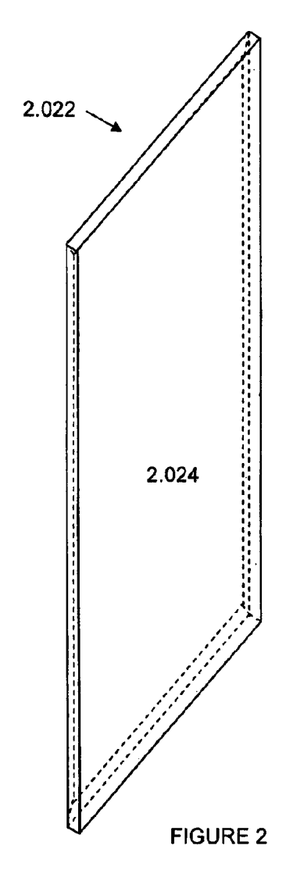
FIG. 2 is an illustration of a second panel adapted for use with the panel of FIG. 1.

A second wall arrangement 2.022 is illustrated in FIG. 2 for assembly with the panel wall 1.002 of FIG. 1. The wall arrangement 2.022 can be a mirror image of the rear wall arrangement 1.002 of FIG. 1. Because the walls are symmetric, the wall arrangements 1.002, 2.022 can be identical, to reduce inventory. The panels are assembled with the peripheral channels facing each other. As discussed below, a joining member is used to connect the channel of the two panels. The walls can be roll formed and transported as a flat-pack.

Figures 3, 4, 5, 6, 7:
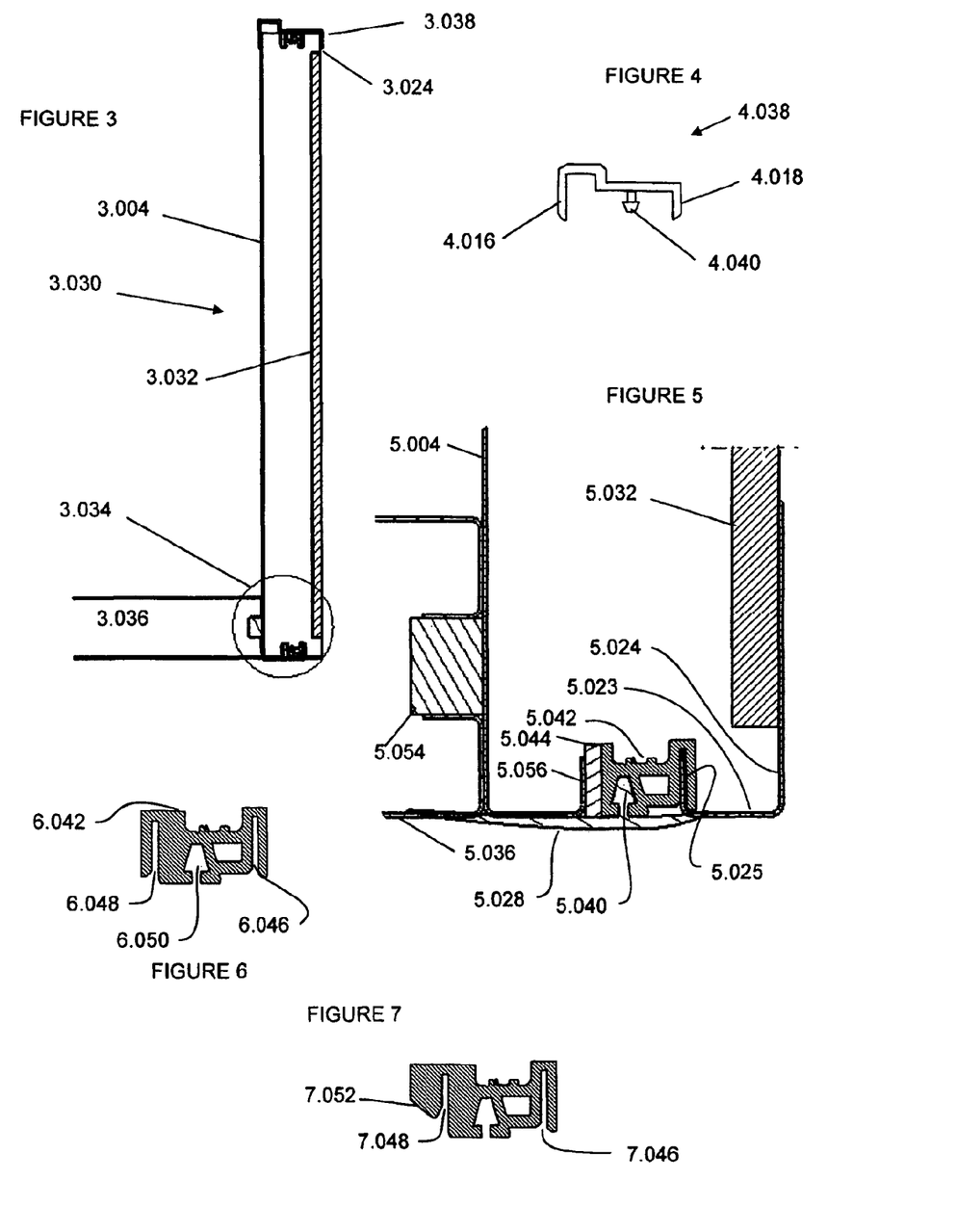
FIG. 3 is a partial section illustration of an assembly of a pair of panels.
FIG. 4 is an illustration of a top edge cap.
FIG. 5 shows detail of an edge of a panel assembly of FIG. 3.
FIG. 6 illustrates a section of an alternative joining extrusion.
FIG. 7 illustrates a section of an alternative joining extrusion.

FIG. 3 illustrates a section of a panel assembly including a panel 3.030 formed by the front wall 3.024 and rear wall 3.004 such as those of FIGS. 2 and 1 with additional panel assembly elements. The front panel 3.024 has a vacuum panel 3.032 attached to its inner surface, for example, by adhesive, or by other suitable means such as welding etc. A trim cap 3.038 is attached to the top edge of the panel assembly. Joining members connect the flanges of the channels as is described in more detail below.

FIG. 4 is a section view of a top cap member 4.038 which is adapted to connect with the snap fit slot of the joining member vis a number of snap fit spigots 4.040. This can extend along the length of the panel. As would be understood by a person skilled in the art, the snap fit elements can be interchanged in an alternative embodiment. The cap can include a pair of legs adapted to extend down the exterior face of the walls 3.004, 3.024.

The rear wall panel 3.004 and the front panel wall 3.024 are connected by a joining member 5.024 better illustrated in the partial view of 3.034 shown enlarged in FIG. 5. The front wall includes an internal peripheral channel formed by the inward bent segment 5.023 and the transverse bent segment or flange 5.025. The rear wall assembly includes a similar mirror image peripheral channel.

The joining member 5.024 can be an elongate member, and can be formed by extrusion. It includes a first slot such as 6.046 in FIG. 6 into which the upturned channel wall 5.025 is engaged, preferably in an interference fit. The open end of the slot 6.046 can be tapered to facilitate engagement of the channel wall 5.025 with the slot. The other side of the joining member is a substantially flat surface which is attached to the inner wall of the flange of the rear wall channel by adhesive. In this embodiment, double sided foam tape 5.044 is used.

The foam tape 5.044 can assist insertion of a snap fit spigot of a trim attachment when the spigot is inserted into the snap fit section slot 6.050 as the foam tape will permit deflection of the side of the snap fit slot. The foam tape 5.044 also allows compression or expansion when the assembly is foam filled, with, for example, polyurethane foam.

A second panel 5.036 is shown as a butt attachment to the panel 5.030. The panel 5.036 can be attached to the panel wall 5.004 by adhesive applied to the abutting surfaces of the two panels.

An overcrowned mushroom headed trim piece 5.028 is attached to the edge of the panel assembly by the snap-fit spigots such as 5.040.

The panel also 5.036 includes a gap similar to the gap between the wall panels 5.004, 5.024 extending along its butting edge in which foam tape 5.054 is inserted. The foam tape 5.054 can absorb tolerances in the assembly and foaming processes and provide a thermal break.

The extrusion can be attached along all four sides of the channel. The corners of the extrusions can be mitred for neat appearance and effective sealing.

The space between the front and back walls can be filled with insulating foam.

The panel walls can be stainless steel, a plastics material or other suitable material.

FIG. 6 illustrates an alternative joining member having a second slot 6.048 for attachment to the channel wall 5.056 of the rear panel. However, with a complete peripheral channel arrangement with mitred corners, such an arrangement cannot be readily utilized because the joining member must be connected to the internal flanges.

FIG. 7 illustrates a modified version of the joining member of FIG. 6 which includes a chamfered surface to facilitate engagement with the rear channel wall. The joining member is attached to the flanges of a first panel wall channel using the slots 7.046. The inclined surface 7.052 serves to deflect the flanges of the peripheral channels so they can snap into the slots 7.048 of the second panel wall when the assembled first panel wall and joining members are pressed against the flanges of the second panel wall. To allow for the additional rigidity of the flanges at the mitred corners, the inner slot 7.048 and inclined surface 7.052 can be terminated short of the corners.

Figure 8:
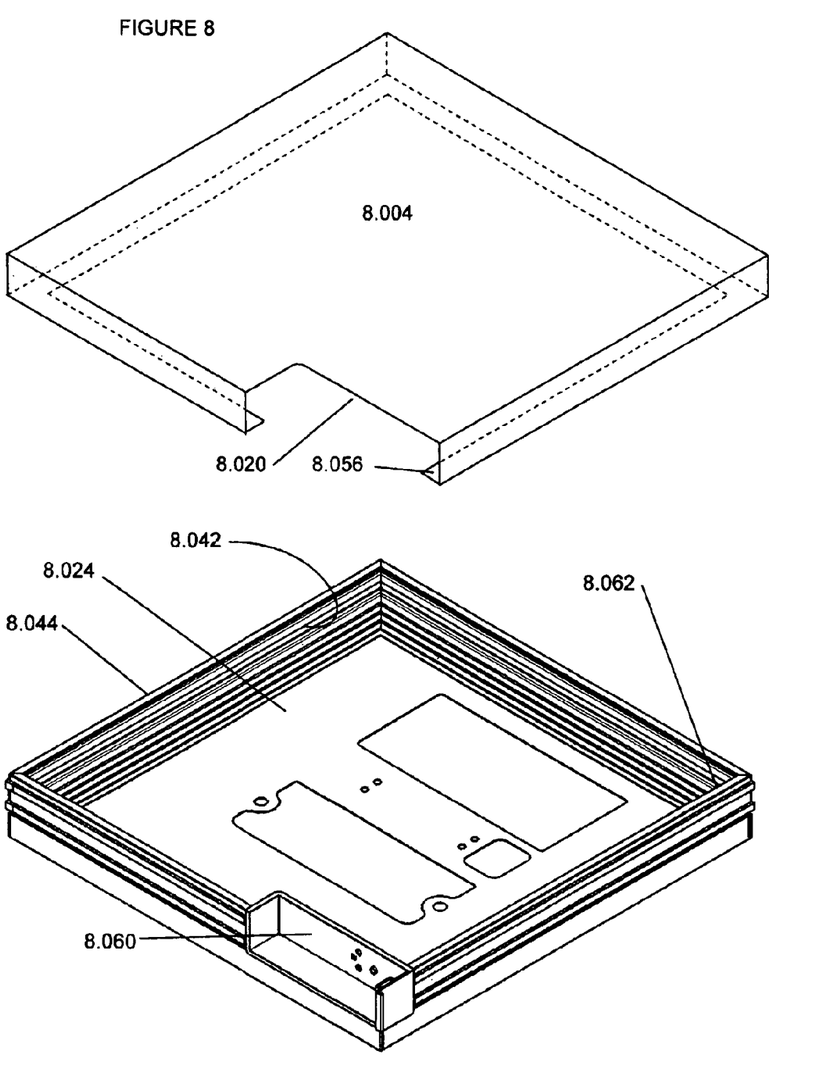
FIG. 8 shows a partially exploded view of a panel assembly including foamed-in brackets.

FIG. 8 shows a partially exploded view of a panel assembly including foamed-in brackets 8.060, 8.062. The bracket 8.060 can be for example, a hinge support bracket to which a hinge can be attached. The bracket 8.062 can be a support bracket by which the refrigeration apparatus can be attached to a wall or adjacent cabinets, etc. The brackets can be installed in the panel wall 8.024 by adhesive, double sided tape, masking tape or other suitable means before the second wall 8.004 is attached to the foam tape 8.044. The second wall panel 8.004 has a cut-out 8.020 adapted to accommodate the bracket 8.060 when the walls are assembled. The adhesive foam tape 8.044 and the joining member 8.042 can also have cut-outs adapted to accommodate the bracket 8.060. The bracket 8.062 does not require any cut-outs as it is seated on the wall 8.024 and is within the channel flange 8.056. The other flange 8.025 is not visible because of joining member 8.042.

When the foam insulation is injected, it will hold the brackets in place and also serve as an adhesive to keep the panels and other elements of the panel assembly in place.

Figure 9:
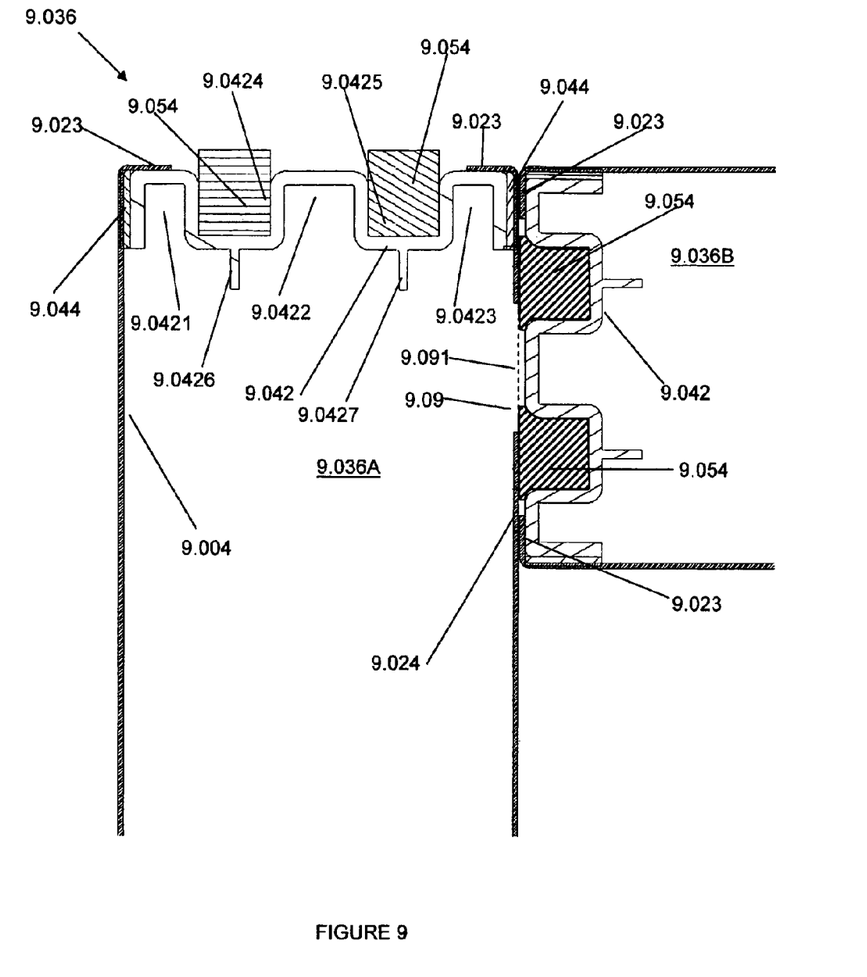
FIG. 9 shows a partial cross section of an alternative panel assembly, and panel join.

Illustrated in FIGS. 9 to 13 is an alternative joining member 9.042, which is an extruded plastic or polymeric member, having three inboard channel or slot portions 9.0421, 9.0422 and 9.0423, and two outboard channel or slot portions 9.0424 and 9.0245. The outboard faces of the two sides of the channels 9.0421 and 9.0423 form an external ninety degree corner, which can be mated to an internal corner of the walls 9.004 and 9.024, with one or both of the outboard faces being used to adhere the joining member 9.042 to the walls 0.004 and 9.024. In the illustration of FIG. 9, only the outboard face of the left side wall of channel 9.0421, and the outboard face of the right side wall of channel 9.0423 are used to mount double sided tape 9.044 to adhere the walls 9.004 and 9.024 into an assembly.

The external channels 9.0424 and 9.0425 each can receive a gasket or foam tape 9.054 such as an EPDM foam tape which is adhered into the channels or slots, and projects proud of the outboard extremity or periphery of the member 9.042, in an outboard direction. As seen at the right hand side of FIG. 9, where the a second assembled panel 9.036B is joined to the wall 9.024 of assembled panel 9.036A, the tape 9.054 compresses and changes shape, to provide a seal. When this join is made the external surfaces of the bent segments 9.023 of the panel 9.036B are adhered by means of a polyurethane based adhesive.

Figure 14:
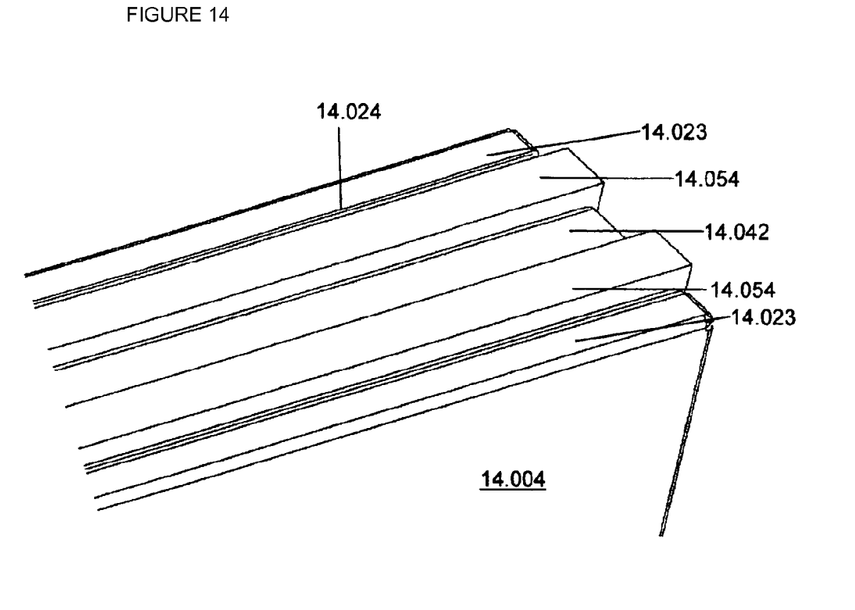
FIG. 14 illustrates a perspective view of a corner of an assembled panel made by the method of FIGS. 9 to 13.

The joining member 9.042 is preferably used all around the edges of an assembled panel, with mitred joins between abutting joining members 9.042, so as to produce a mitred external corner as represented in FIG. 14.

Figure 11:
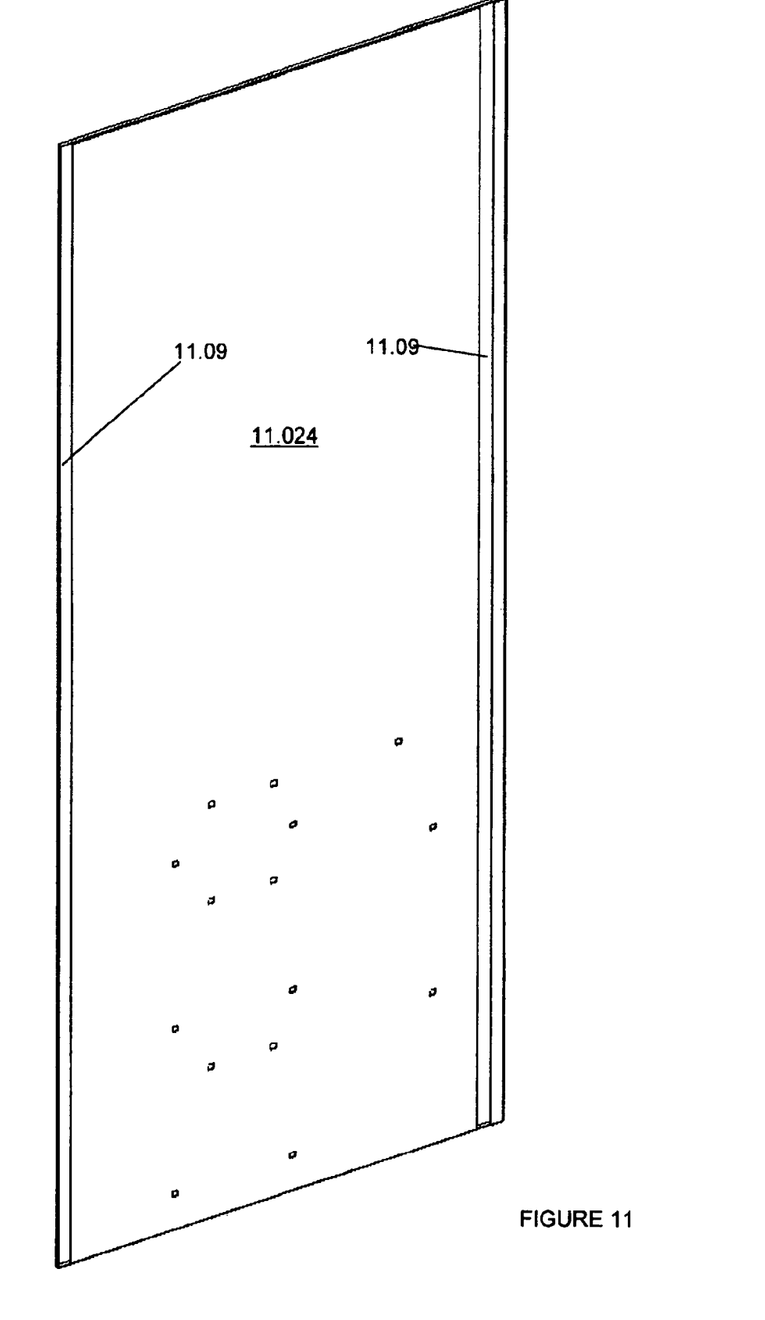
FIG. 11 illustrates a perspective view of a metal panel to be used in the panel assembly of FIG. 9.
Figure 12:
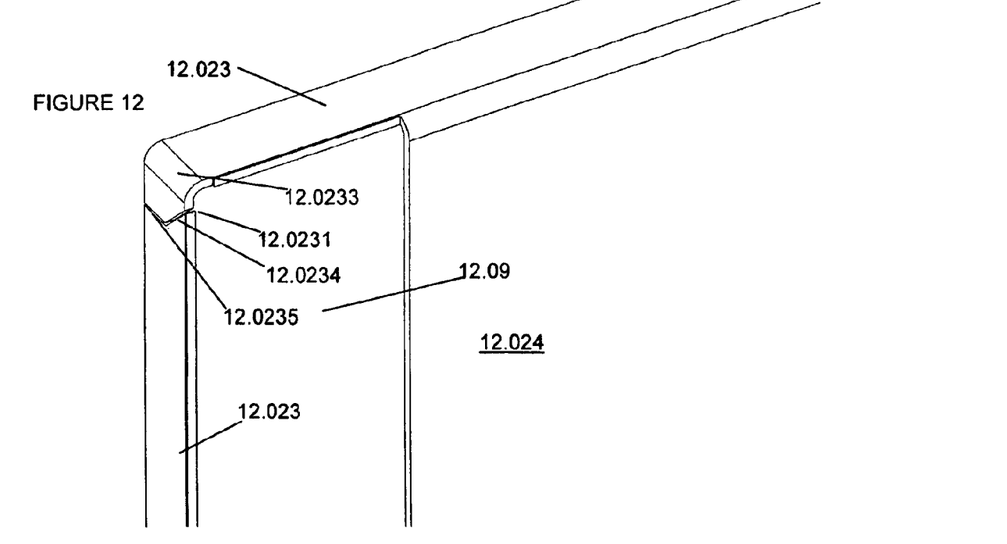
FIG. 12 illustrates an exploded perspective view of the upper left hand corner of the panel of FIG. 11.
Figure 13:
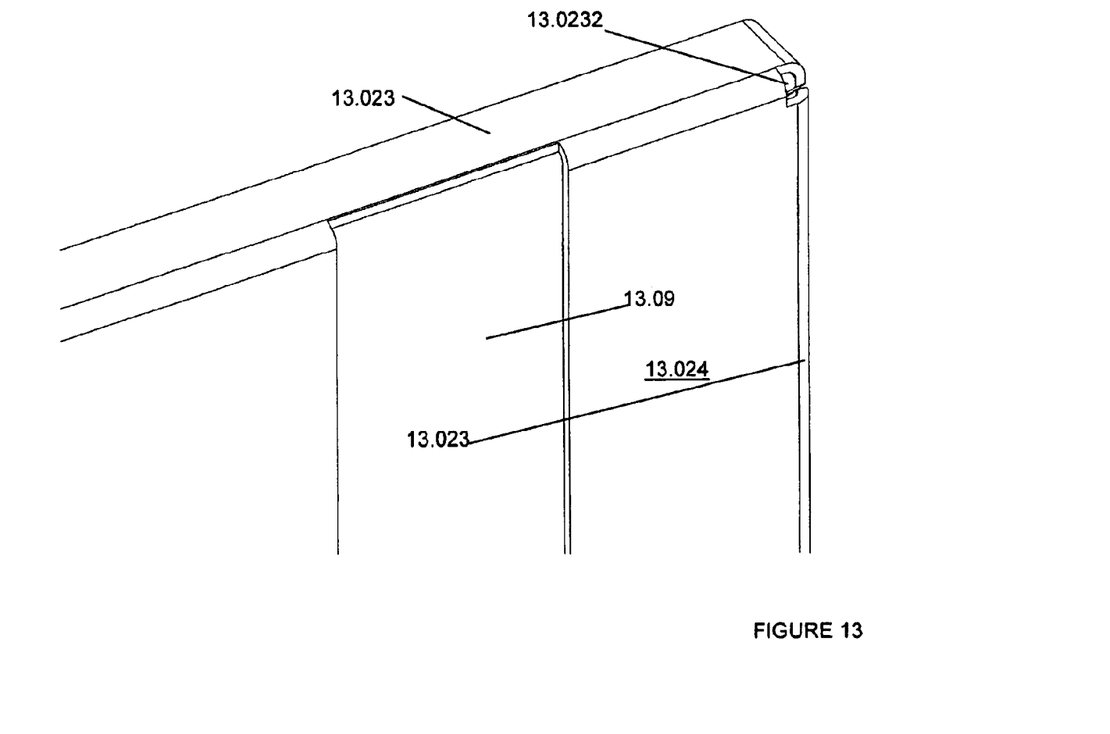
FIG. 13 illustrates an exploded perspective view of the upper right hand corner of the panel of FIG. 11.

The panel 9.036A and 9.036B are different to each other in that the panel 9.036A has a thermal break 9.09 in the wall 9.024, which as better seen in FIGS. 11, 12 and 13, is a longitudinal slot cut through the wall 9.024. This slot assist in ensuring heat is not transferred into or out of the assembled panels because conduction through the metal, of the wall 9.024. Before the interior of the panel 9.036A is filled with foam, the thermal break 9.09 is sealed by tape to prevent foam escaping, and this, will result, once foamed-in in a foam exterior surface represented by broken line 9.091, against which the tape 9.054 in the panel 9.036B can also make contact with.

With respect to assisting with the foaming-in of the joining member 9.042 into the assembled panel 9.036A or 9.036B, the member 9.042 includes inwardly directed projections 9.0426 and 9.0427 respectively extending from the inboard sides of the bases of channel 9.0424 and 9.0425. These projections provide greater surface area of contact for the expanding foam to adhere to as it sets.

Figure 10:
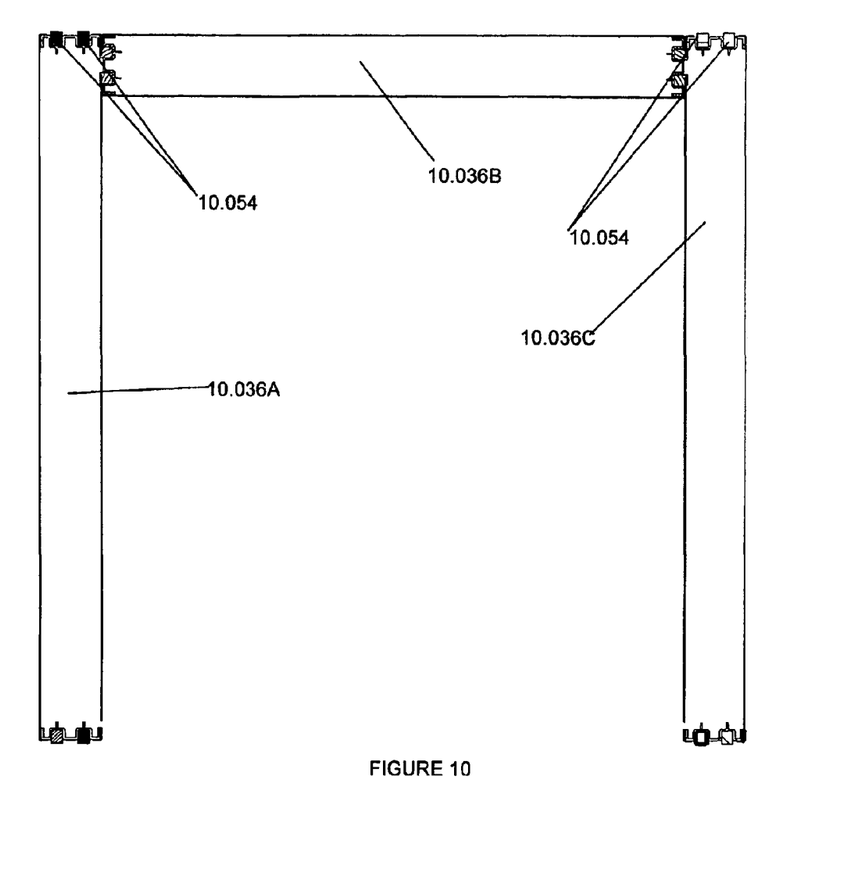
FIG. 10 shows a cross section through three panels joined to form a cabinet.

Illustrated in FIG. 10, is a representation of the joining of three panels 10.036A, 10.036B and 10.036C, joined together by means of the joining system described with respect to FIG. 9. FIG. 10 is a plan view section of the three walls of a cabinet. It will be noted that the rear of the cabinet has foam tape 10.054 present and exposed, however if desired the tape 10.054 can be removed or the panels 10.036A and 10.036C assembled so that the external faces of the joining members do not include such foam tape.

Illustrated in, FIGS. 11 to 13 is the wall panel 11.024, 12.024 and 13.024. The whole wall panel 11.024 is shown in FIG. 11, and it can be seen that on the left hand side of the panel 11.024 is the left hand side thermal break 11.09 which is slot or rectangular elongated opening down the whole length of the wall 11.024. The upper corner of panel is seen in FIG. 12, which further illustrates that the upper edge bent segment 12.023 extends past the corner 12.0233 in a downward direction to meet up with the side edge bent segment 12.023. A join line 12.0231 is provided which is first angled at 12.0234 to the vertical and then terminates at the rear edge with a horizontal segment 12.0235. By providing a join line which is first inclined to the vertical and then horizontal, this provides a relatively safe edge to work with, and by virtue of the foam on the inside surface of the bent segments 12.023 to adhere the joining member 9.042 thereto, a strong corner join is produced which provides a better finish.

Figure 15:
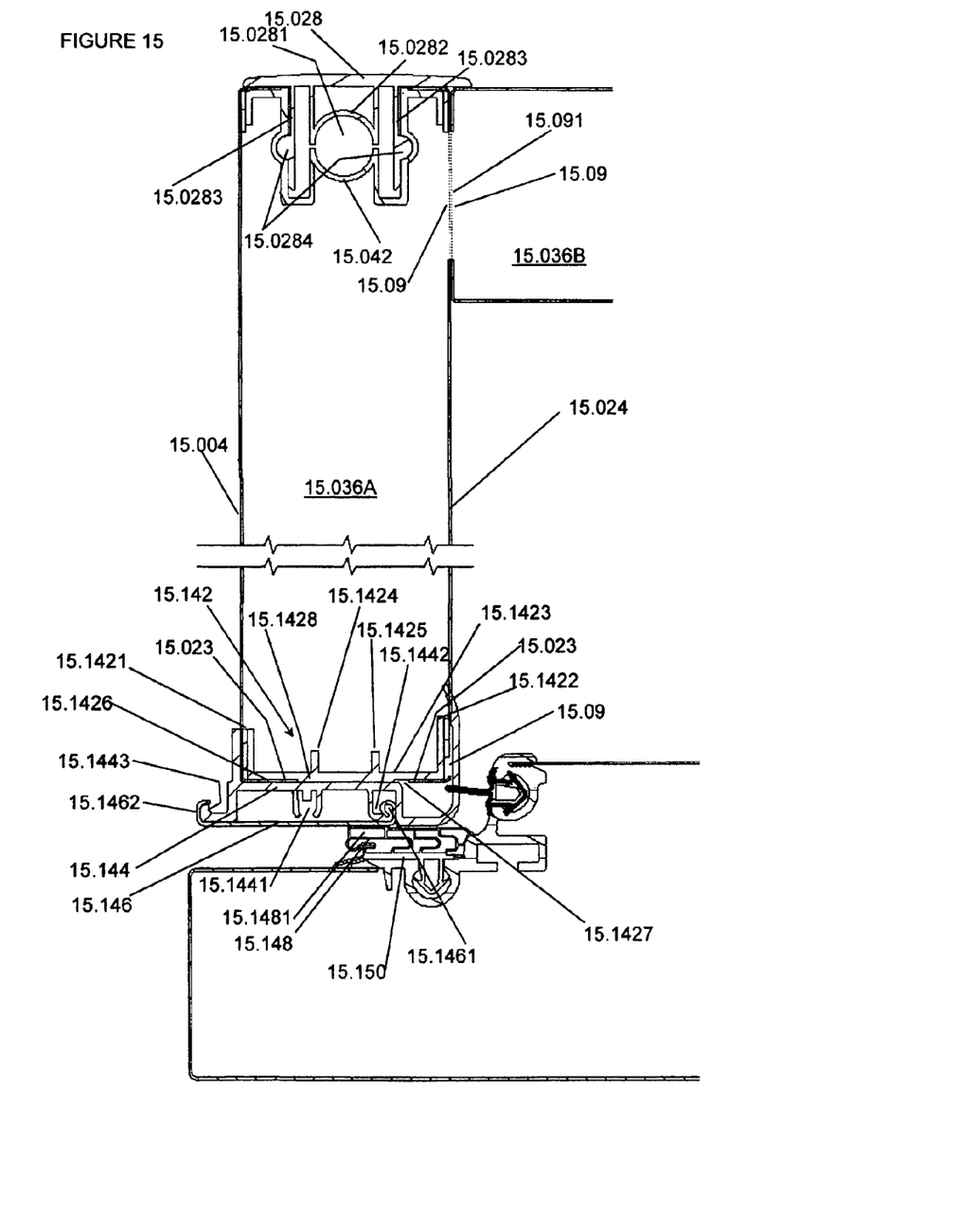
FIG. 15 illustrates a cross-section view of an alternative panel assembly mechanism and panel joining method and interaction with a door panel.

Illustrated in FIG. 15 is an alternative panel assembly mechanism and panel joining method which is also illustrated having the front edge interacting with a door panel. This assembly mechanism is similar to that of previous figures and like parts have been like numbered.

In FIG. 15 the side panel 15.036A is joined to a rear panel 15.036, which will be described in more detail later. While front edge of the panel 15.036A has a join member 15.142, which can be described as having channel construction with side walls 15.1421 and 15.1422 extending generally perpendicularly from the central portion 15.1423. The side wall 15.1422 is longer in extension than the wall 15.1421 so that it can extend across the thermal break gap 15.09 in the region where they overlap. The join member 15.142 also includes shorter intermediate walls 15.1424 and 15.1425, which assist the join member 15.142 in being foamed into the panel and to keep the join member secured to the panel when the foam has set.

It will be noted that the outboard face of the join member 15.142 includes rebated edge surfaces 15.1426 and 15.1427, which allows the bent segments 15.023 to sit therein. By this means the outer surfaces of segments 15.023 and the relatively protruding surface 15.1428 form a generally straight or planar end onto which can be attached a finishing member or break piece 15.144. The break piece 15.144 is attached to the extrusion or join member 15.142 by gluing or any appropriate joining means. A trim piece 15.146 is attached to the break piece 15.144. The trim piece 15.146 can be of a magnetisable material for producing sealing force with the seal 15.148 which has a magnet 15.1481 which is mounted a door extrusion 15.150.

The break piece 15.144 includes a series of clips or an extruded or elongated clip structure such as 15.1441 adapted to receive a heat transfer fluid ducting, conduit or tubing, which is not illustrated. The clips hold the heat transfer fluid ducting, conduit or tubing in proximity to the trim member 15.146 so heat from the ducting, conduit or tubing can heat the trim member 15.146 in the region where condensation may otherwise form.

Figure 16:
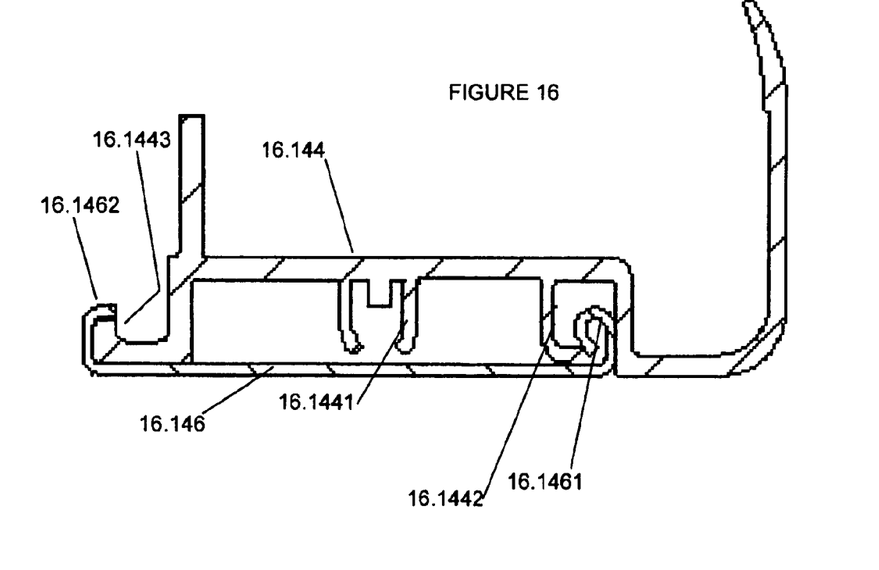
FIG. 16 illustrates a detailed cross sectional view of the end section and trim member to complete the front edge of eth panel of FIG. 15.

From FIGS. 15 and 16, it can be seen that the trim member 15.146 has a curled formation on its inboard edge 15.1461, and on its outboard edge 15.1462 it has a two bends to from a generally J-shaped edge. The break piece 15.144 includes an inboard hook 15.1442 and an outboard hook 15.1443, so that the trim 15.146 can be first engaged with hook 15.1443 by edge 15.1462 and then the trim rotated so that the edge 15.1461 can push past the hook 15.1442 and then be caught and held in place by the hook 15.1442.

At the rear end of side panel 15.036A, the rear edge of the panel 15.036A is formed from a join member 15.042, which is shaped to receive a complementarily shaped capping member 15.028. The members 15.042 and 15.028 together create a duct or conduit 15.0281, into which heat transfer fluid tubes, water tubes, electrical and signal cables or wires or harnesses can be located and run. If desired the formation 15.0282 which forms the other half of cylindrically shaped conduit 15.0281 can be absent, thus providing an even bigger conduit cavity, if required.

The cap 15.028 includes two inwardly directed projections 15.0283 having locking members 15.0284 to engage complementarily shaped recesses on the join member 15.042.

It will be noted from FIG. 15 that the cap 15.028 overlaps the external join line between the panels 15.036A and 15.036B, to thereby hide the join line. The join between the panels 15.036A and 15.036B is similar to that illustrated in FIG. 9, except that the panel 15.036B does not include a join member between the inboard and outboard panels, but still includes a thermal break 15.09, as does the panel 15.036A which includes a side located thermal break 15.09. The two panels can be joined together by gluing or otherwise adhering the metal surfaces which make contact with each other.

The join member 15.042 includes rebated edges, in a similar manner to the join member 15.142, so as to receive the bent edges of the panels 15.004 and 15.024.

The join member 15.042 is preferably used on the rear edge and upper edges of the side panels 15.036A, while it is preferred that the join member 15.142 is used on the lower and front edges of the side panels 15.036. However, which join member is to some extent dependent on the need to utilise the conduit 15.0281.

It will be readily understood that the extrusion from which cap member 15.028 is manufactured will be usable on both the left and right rear side panels to cover the join line between the panels 15.036A and 15.036B, as it simply requires an orientation adjustment. This observation applies to the trim member 15.146, the break piece 15.144 and join member 15.142, which each have an element of right or left handedness, but this is readily resolved by rotation before use for the other side.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise. These terms will normally refer to orientations shown in the drawings.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A panel assembly comprising:

a first panel;

a second panel adjacent and parallel to the first panel to form a volume between the first panel and the second panel;

the first panel having a first panel edge that is turned towards the second panel to form a first internal corner;

the second panel having a second panel edge that is turned towards the first panel to form a second internal corner, the second panel edge being spaced from the first panel edge to form a gap therebetween;

an elongate joining member joining the first panel and the second panel and having an inboard side facing the volume between the first panel and the second panel and an outboard side facing away from the volume between the first panel and the second panel, the elongate joining member having:

a first corner formation received in the first internal corner and comprising a first side adjacent the first panel and a first end adjacent the first panel edge, a second corner formation received in the second internal corner and comprising a second side adjacent the second panel and a second end adjacent the second panel edge, wherein the second side is parallel to the first side, and at least one outboard channel formed on the outboard side of the elongate joining member and located between the first corner formation and the second corner formation, the at least one outboard channel being located in the gap between the first panel and the second panel and facing away from the volume between the first panel and the second panel, a sealing means or insulation foam located in the at least one outboard channel; and wherein the panel assembly is configured for use in a cold apparatus.

2. The panel assembly as recited in claim 1, wherein the elongate joining member is a profiled extrusion.

3. The panel assembly as recited in claim 1, further comprising at least two outboard channels, each outboard channel adapted to receive a respective sealing means or insulation foam.

4. The panel assembly as recited in claim 1, wherein the elongate joining member includes one or more inboard directed projections extending from an inboard side of the elongate joining member into the volume between the first panel and the second panel or channels to increase a surface area of the inboard side of the elongate joining member.

5. The panel assembly as recited in claim 1, wherein the sealing means comprises is in the form of a gasket or a tape.

6. The panel assembly as recited in claim 5, wherein the sealing means projects, in at least an uncompressed state, in an outboard direction from an outboard periphery of the outboard channel.

7. The panel assembly as recited in claim 1, further comprising insulating foam located between the first panel and the second panel.

8. The panel assembly of claim 1, wherein the first side, first end, second side and second end are formed on the outboard side of the elongate joining member.

9. The panel assembly of claim 1, wherein the elongate joining member includes one or more inboard channels formed on the inboard side of the elongate joining member and facing the volume between the first panel and the second panel to increase a surface area of the inboard side of the elongate joining member.

10. The panel assembly of claim 1, further comprising a third panel perpendicular to the first panel and the second panel and adjacent the first panel edge, the second panel edge, and the outboard side of the elongate joining member, wherein the sealing means or insulation foam contacts the third panel.

11. The panel assembly of claim 10, wherein the sealing means or insulation foam is compressed between the outboard side of the elongate joining member and the third panel.

12. The panel assembly of claim 1, further comprising an adhesive tape joining at least one of: the first panel to the first side of the first corner formation, or the second panel to the second side of the second corner formation.

* * * * *